US012656707B2

(12) United States Patent
Suruga et al.

(10) Patent No.: US 12,656,707 B2
(45) Date of Patent: Jun. 16, 2026

(54) IMAGE FORMING APPARATUS, DEVICE, AND BEARING

(71) Applicant: FUJIFILM Business Innovation Corp., Tokyo (JP)

(72) Inventors: Misaki Suruga, Kanagawa (JP); Keiji Sasaki, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 18/156,409

(22) Filed: Jan. 19, 2023

(65) Prior Publication Data

US 2024/0103398 A1 Mar. 28, 2024

(30) Foreign Application Priority Data

Sep. 27, 2022 (JP) ................................ 2022-154058

(51) Int. Cl.
*G03G 15/08* (2006.01)
*G03G 21/16* (2006.01)

(52) U.S. Cl.
CPC ..... *G03G 15/0815* (2013.01); *G03G 21/1647* (2013.01); *G03G 21/1676* (2013.01)

(58) Field of Classification Search
CPC .......... G03G 15/0815; G03G 21/1647; G03G 21/1676; G03G 15/757
See application file for complete search history.

(56) References Cited

U.S. PATENT DOCUMENTS

| | | | | |
|---|---|---|---|---|
| 5,170,212 A * | 12/1992 | DeCecca | G03G 15/0822 | 384/420 |
| 2001/0048780 A1* | 12/2001 | Markovitch | F16C 33/1065 | 384/291 |
| 2007/0177833 A1* | 8/2007 | Egami | F16C 33/1065 | 384/279 |
| 2009/0046960 A1* | 2/2009 | Hibi | F16C 33/14 | 310/90 |
| 2010/0003059 A1* | 1/2010 | Kitamura | G03G 21/1642 | 399/397 |

FOREIGN PATENT DOCUMENTS

| | | |
|---|---|---|
| JP | 2003130054 | 5/2003 |
| JP | 2015148285 | 8/2015 |

* cited by examiner

*Primary Examiner* — G.M. A Hyder
(74) *Attorney, Agent, or Firm* — JCIPRNET

(57) ABSTRACT

An image forming apparatus includes: a rotary body including a rotation shaft; and a bearing that supports the rotation shaft and that includes a lubricant layer formed of oil; resin; or the like and provided at a portion to be in contact with the rotation shaft; and a holding part that holds powder produced as a result of the lubricant layer being abraded.

18 Claims, 13 Drawing Sheets

IMAGE FORMING APPARATUS, DEVICE, AND BEARING

CROSS-REFERENCE TO RELATED APPLICATIONS

This application is based on and claims priority under 35 USC 119 from Japanese Patent Application No. 2022-154058 filed Sep. 27, 2022.

BACKGROUND

(i) Technical Field

The present disclosure relates to an image forming apparatus, a device, and a bearing.

(ii) Related Art

Japanese Unexamined Patent Application Publication No. 2015-148285 discloses a plain bearing having an outer circumferential part formed of a metal base material, and a resin layer formed of a resin material integrally therewith by injection molding. Japanese Unexamined Patent Application Publication No. 2003-130054 discloses a motor thrust bearing formed of a multilayer sheet material having at least two layers, at least a portion in contact with a rotation shaft being formed of a resin having a glass transition temperature of 180° C. or more.

SUMMARY

Structures for supporting a rotary body includes a structure in which a rotation shaft provided on a rotary body is supported by using a bearing. While it is desirable to ensure sliding between the rotation shaft and the bearing, use of low-cost materials and reduction in component count are required due to lack of material in these days and the demand for cost cutting. Although a standard resin material having no sliding properties may be used to utilize low-cost materials, a sufficient life cannot be obtained by simply applying coating on the surface of the standard resin material. Aspects of non-limiting embodiments of the present disclosure relate to extending the life of the structure in which a rotation shaft is supported by using a bearing, compared with a structure in which the surface of the standard resin material is simply coated.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: a rotary body including a rotation shaft; and a bearing that supports the rotation shaft and that includes a lubricant layer formed of oil; resin; or the like and provided at a portion to be in contact with the rotation shaft; and a holding part that holds powder produced as a result of the lubricant layer being abraded.

BRIEF DESCRIPTION OF THE DRAWINGS

Exemplary embodiment of the present disclosure will be described in detail based on the following figures, wherein.

DETAILED DESCRIPTION

Figure 1:
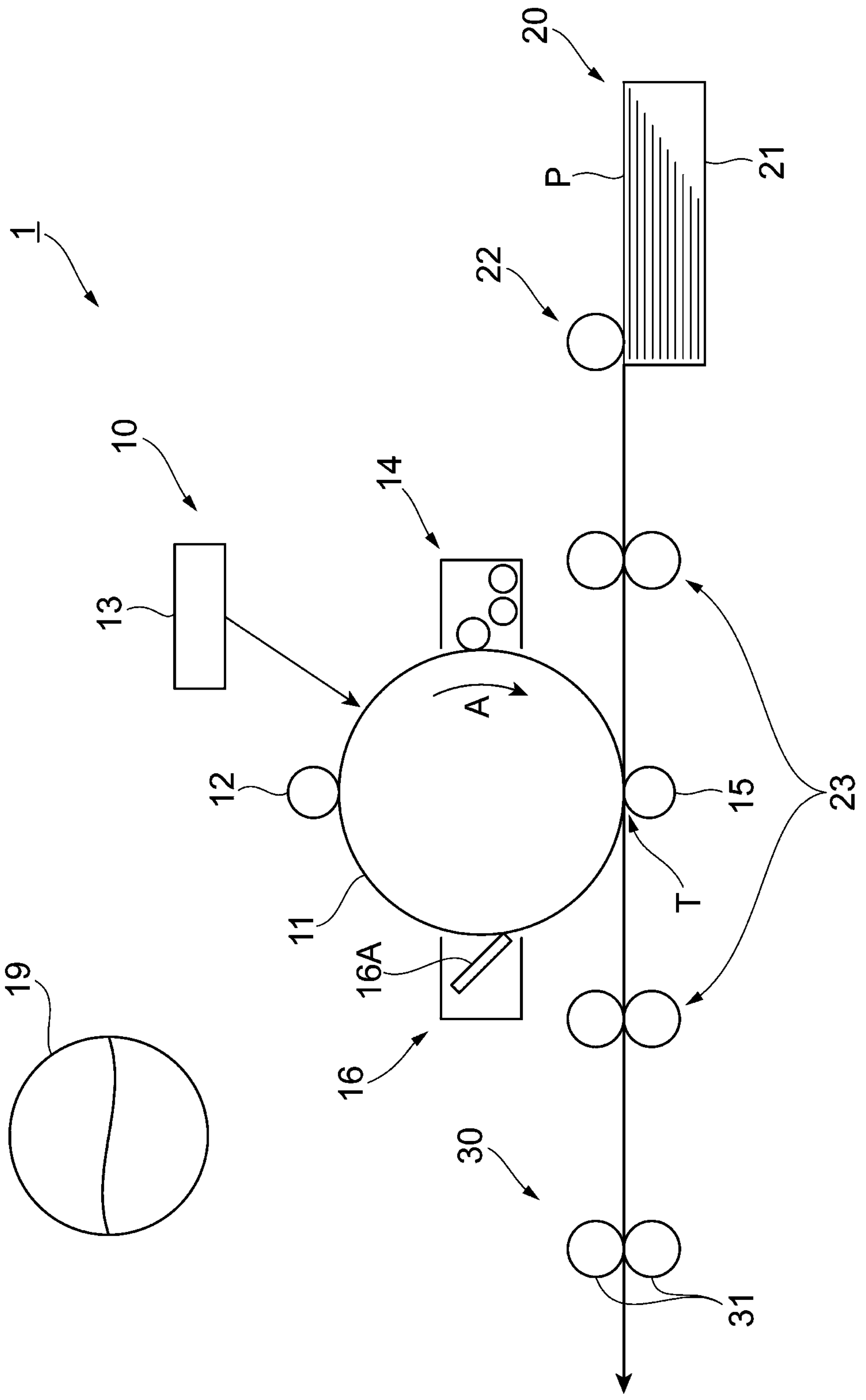
FIG. 1 shows the overall configuration of an image forming apparatus.

Referring to the attached drawings, an exemplary embodiment of the present disclosure will be described below. FIG. 1 shows the overall configuration of an image forming apparatus 1. FIG. 1 shows the image forming apparatus 1 viewed from the front side. The image forming apparatus 1 includes an image forming unit 10, a paper feed unit 20, and a fixing unit 30. The image forming unit 10 forms a toner image on a sheet P by using an electrophotographic system. The paper feed unit 20 feeds a sheet P to the image forming unit 10. The fixing unit 30 fixes, to the sheet P, a toner image (image) formed on the sheet P by the image forming unit 10.

The image forming unit 10 includes a photoconductor drum 11 rotating in an arrow A direction. The image forming unit 10 also includes a charging roller 12, an exposure device 13, a developing device 14, a transfer roller 15, and a cleaning device 16. The photoconductor drum 11, serving as an example of an image carrier, is formed of a cylindrical body. The cylindrical body has a photosensitive layer (not shown) on the surface thereof. The charging roller 12 is formed of a conducting rubber roller or the like and charges the photoconductor drum 11. The exposure device 13 radiates light generated by a light source, such as a laser light source or a light emitting diode (LED), onto the photoconductor drum 11 charged by the charging roller 12 to form an electrostatic latent image on the surface of the photoconductor drum 11.

The developing device 14 allows toner to be attached to the surface of the photoconductor drum 11 to develop the electrostatic latent image formed on the photoconductor drum 11 with predetermined color toner. This way, in this exemplary embodiment, a toner image is formed on the surface of the photoconductor drum 11. Furthermore, a developer storage container 19 storing the developer to be supplied to the developing device 14 is provided. New developer is supplied from the developer storage container 19 to the developing device 14 through a developer transport path (not shown).

The transfer roller 15 is formed of a conducting rubber roller or the like. In this exemplary embodiment, a portion where the transfer roller 15 and the photoconductor drum 11 face each other serves as a transfer part T, and a toner image held on the photoconductor drum 11 is transferred to a transported sheet P at the transfer part T. The cleaning device 16 is provided with a contact member 16A disposed so as to be in contact with the photoconductor drum 11, and the cleaning device 16 removes attached matter, such as toner, on the photoconductor drum 11.

The paper feed unit 20 includes a paper storage container 21 that stores sheets P, and a feed mechanism 22 that sends out a sheet P from the paper storage container 21. Furthermore, in this exemplary embodiment, a paper transport mechanism 23 that transports the sheet P, sent out from the paper feed unit 20, through the transfer part T and the fixing unit 30 is provided. The fixing unit 30 includes a pair of rotary bodies 31 that rotate in a state of being in contact with each other. One of the pair of rotary bodies 31 is provided with a heat source (not shown) therein. In the fixing unit 30, these two rotary bodies 31 apply pressure and heat to the sheet P to fix the toner image on the sheet P to the sheet P.

An image forming operation of the image forming apparatus 1 will be described. In the image forming unit 10, the photoconductor drum 11 rotating in the arrow A direction is charged by the charging roller 12. Next, the exposure device 13 performs exposure, and an electrostatic latent image corresponding to image information is formed on the surface of the photoconductor drum 11. Thereafter, the developing device 14 performs development to form a toner image corresponding to the electrostatic latent image on the surface of the photoconductor drum 11.

The toner image formed on the photoconductor drum 11 is transported to the transfer part T with the rotation of the photoconductor drum 11. A sheet P sent out from the paper feed unit 20 is transported to the transfer part T by the paper transport mechanism 23. Then, the toner image on the photoconductor drum 11 is transferred to the transported sheet P at the transfer part T. Thereafter, the sheet P having the toner image transferred thereto passes through the fixing unit 30 where the sheet P is heated and pressed, whereby the toner image is fixed to the sheet P.

Figure 2:
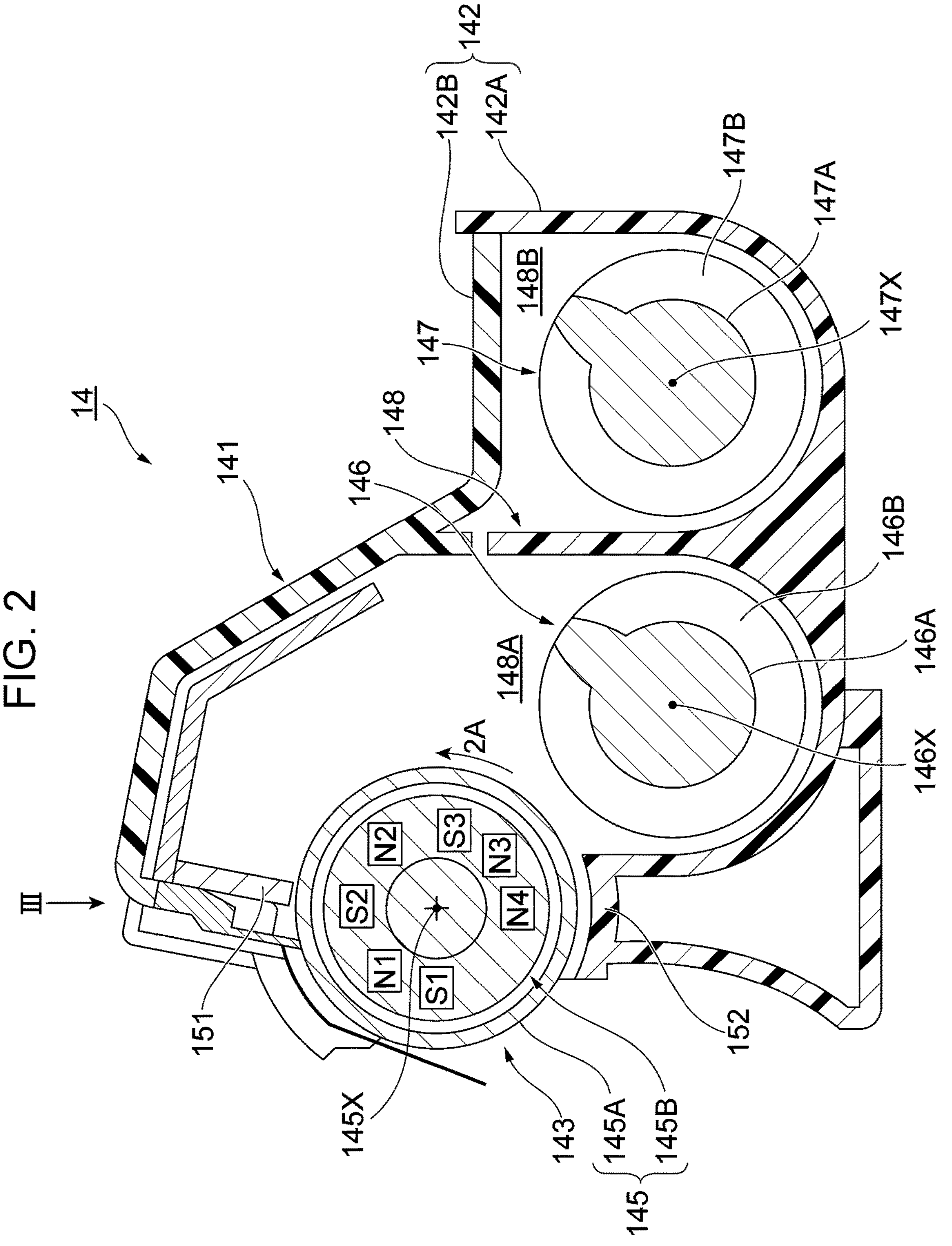
FIG. 2 shows a developing device.

FIG. 2 shows the developing device 14. The developing device 14 includes a storage part 141 that accommodates the developer (not shown) therein. The storage part 141 is formed of a storage housing 142 made of resin. The storage housing 142 includes a lower housing 142A located on the lower side and an upper housing 142B located above the lower housing 142A.

The storage housing 142 has an opening 143 at a portion facing the photoconductor drum 11 (see FIG. 1). A developing roller 145 that allows the developer to be attached to the surface of the photoconductor drum 11 is provided at the opening 143. The developing roller 145 is formed in a cylindrical shape and is disposed so as to extend in a front-rear direction of the image forming apparatus 1. Furthermore, the developing roller 145 is disposed so as to extend in the longitudinal direction of the developing device 14.

The developing roller 145 includes a developing sleeve 145A formed of a cylindrical body and rotationally driven, and a magnetic roller 145B disposed inside the developing sleeve 145A. The developing sleeve 145A, serving as an example of a rotary body, is formed of, for example, a metal, such as steel use stainless (SUS). The developing sleeve 145A rotates in the arrow 2A direction in FIG. 2. Furthermore, the developing device 14 includes a first transport member 146 and a second transport member 147 that transport the developer.

The first transport member 146 and the second transport member 147 are provided on the opposite side of the developing roller 145 from the photoconductor drum 11 (see FIG. 1). The first transport member 146, serving as an example of a transport member, includes a rotation shaft 146X extending along a rotationally driven rotation shaft 145X of the developing sleeve 145A, and rotates about the rotation shaft 146X to transport the developer in the storage part 141.

More specifically, the first transport member 146 includes a cylindrical part 146A extending along the rotation shaft 145X of the developing sleeve 145A, and a spiral part 146B projecting from the outer circumferential surface of the cylindrical part 146A and having a spiral shape. The first transport member 146 presses the developer with the spiral part 146B to transport the developer in the axial direction of the first transport member 146.

The second transport member 147 also includes a rotation shaft 147X extending along the rotation shaft 145X of the developing sleeve 145A, and rotates about the rotation shaft 147X to transport the developer in the storage part 141. The second transport member 147 also includes a cylindrical part 147A extending along the rotation shaft 145X of the developing sleeve 145A, and a spiral part 147B projecting from the outer circumferential surface of the cylindrical part 147A having a spiral shape. The second transport member 147 also presses the developer with the spiral part 147B to transport the developer in the axial direction of the second transport member 147.

The first transport member 146 is disposed so as to extend in the front-rear direction of the image forming apparatus 1 and transports the developer toward, for example, the far side with respect to the plane of the drawing of FIG. 2. The second transport member 147 is also disposed so as to extend in the front-rear direction of the image forming apparatus 1. The second transport member 147 transports the developer toward, for example, the near side with respect to the plane of the drawing of FIG. 2.

Furthermore, in this exemplary embodiment, the inner space of the storage housing 142 is divided by a vertically extending partition 148 to provide a first space 148A located closer to the photoconductor drum 11 and a second space 148B located farther from the photoconductor drum 11 in the storage housing 142. The first transport member 146 is disposed in the first space 148A, and the second transport member 147 is disposed in the second space 148B.

The partition 148 does not extend over the entire area of the storage housing 142 in the longitudinal direction. The partition 148 is not provided at the far end and the near end of the storage housing 142. There are non-provision portions, where the partition 148 is not formed, is at both ends of the storage housing 142 in the longitudinal direction. This allows the developer to circulate in the developing device 14 in this exemplary embodiment.

More specifically, in this exemplary embodiment, the first transport member 146 transports the developer in the first space 148A toward the far side with respect to the plane of the drawing of FIG. 2. The developer having reached the far end of the storage housing 142 moves to the second space 148B through the non-provision portion. The developer having moved to the second space 148B is transported to the near end of the storage housing 142 by the second transport member 147. The developer then moves to the first space 148A through the non-provision portion provided at the near end. Subsequently, this movement of the developer is repeated, and the developer circulates in the developing device 14. Furthermore, in this exemplary embodiment, this circulation of the developer stirs the developer.

Furthermore, the developing device 14 has a layer restricting part 151 above the developing roller 145. The layer restricting part 151 is disposed so as to have a certain gap with respect to the developing roller 145. The layer restricting part 151 restricts the movement of some developer attached to the surface of the developing roller 145 to make the developer attached to the surface of the developing roller 145 have a predetermined thickness. Furthermore, the developing device 14 has, below the developing roller 145, a lower facing part 152 facing the developing roller 145. In this exemplary embodiment, the opening 143 is provided between the layer restricting part 151 and the lower facing part 152, and the developing roller 145 is provided in the opening 143.

Next, the magnetic roller 145B disposed inside the developing sleeve 145A will be described. The magnetic roller 145B has seven magnetic poles N1 to N4 (N poles) and S1 to S3 (S poles) arranged along the circumferential direction of the magnetic roller 145B. The magnetic pole N3 attracts the developer transported by the first transport member 146 and allows the developer to be attached to the surface of the developing sleeve 145A. The magnetic pole S2 (trimming pole), together with the layer restricting part 151, makes the developer attached to the surface of the developing roller 145 have a predetermined thickness.

The magnetic poles S3, N2, and N1 serve as transport poles and move the toner on the developing sleeve 145A downstream in the rotation direction of the developing sleeve 145A. The magnetic pole S1, together with the adjoining magnetic pole N1, erects the developer. Furthermore, the magnetic pole N4, together with the adjoining magnetic pole N3, forms a repulsive magnetic field to separate the developer attached to the surface of the developing sleeve 145A from the developing sleeve 145A. As a result, the developer attached to the developing sleeve 145A returns to the first transport member 146. In this exemplary embodiment, the toner on the developing sleeve 145A moves to the photoconductor drum 11 (see FIG. 1) to form a toner image on the photoconductor drum 11. Then, this toner image is transferred to a sheet P.

Figure 3:
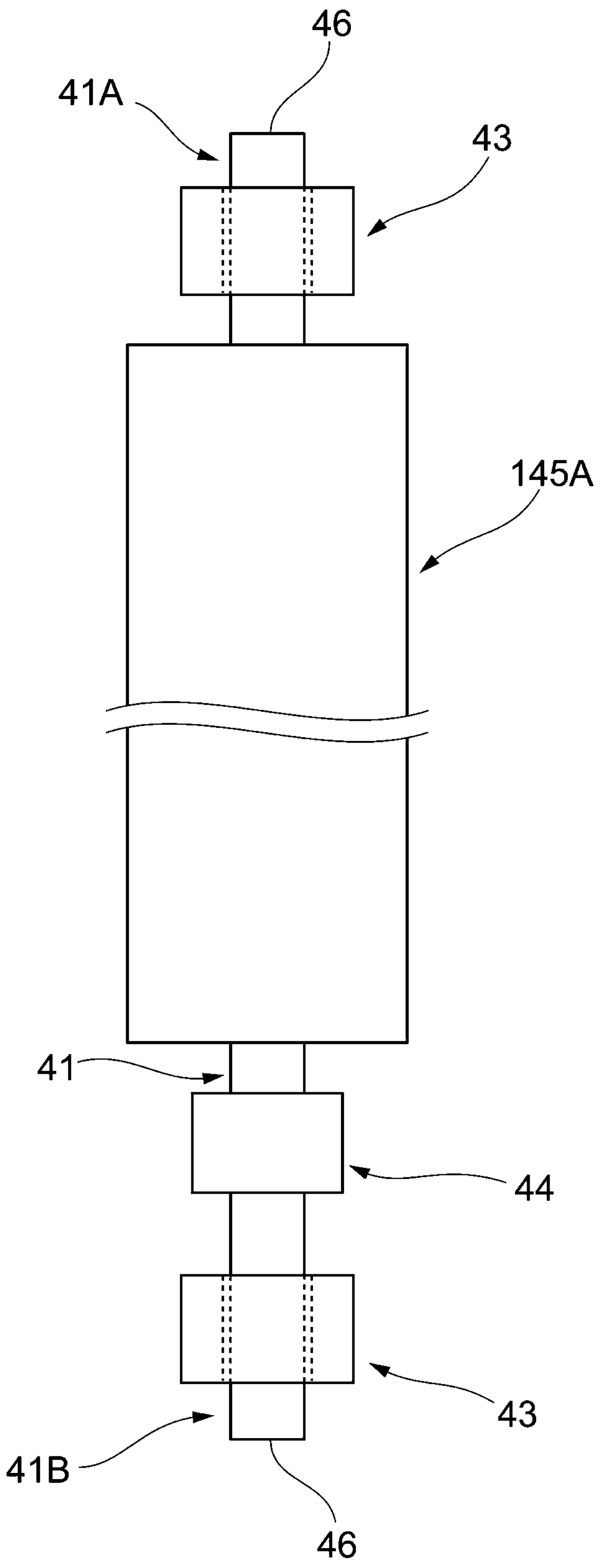
FIG. 3 shows a developing sleeve as viewed from the arrow III direction in FIG. 2.

FIG. 3 shows the developing sleeve 145A as viewed from the arrow III direction in FIG. 2. The developing sleeve 145A, serving as an example of a rotary body, has a cylindrical rotation shaft 41. Furthermore, although not shown in FIG. 2, as shown in FIG. 3, the developing device 14 according to this exemplary embodiment is provided with bearings 43 that support the rotation shaft 41 provided on the developing sleeve 145A. There are two bearings 43, one corresponding to one end 41A and the other corresponding to the other end 41B of the rotation shaft 41. The bearings 43 are made of a resin material.

Furthermore, the developing sleeve 145A is provided with a driving-force receiving part 44 that receives a driving force from a motor (not shown). In this exemplary embodiment, the driving-force receiving part 44 receives a driving force and rotates the developing sleeve 145A. The driving-force receiving part 44 is formed of a cylindrical gear attached to the rotation shaft 41. The driving-force receiving part 44 is meshed with a supply gear (not shown) that supplies a driving force to the driving-force receiving part 44 and receives the driving force from the supply gear. The extreme ends at one end 41A and the other end 41B of the rotation shaft 41 are free ends 46 and are more likely to swing.

Figure 4:
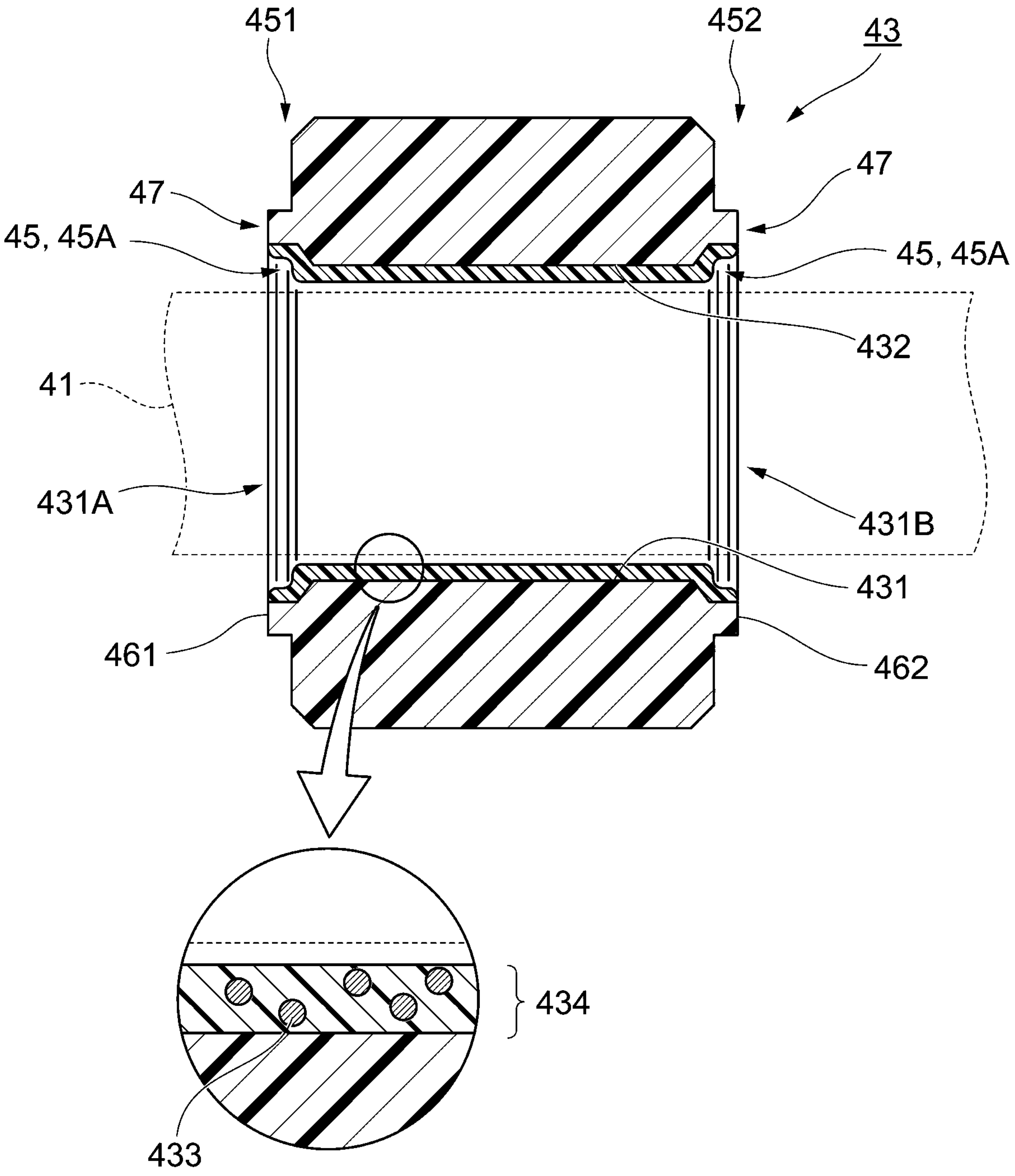
FIG. 4 is a sectional view of a bearing.

FIG. 4 is a sectional view of a bearing 43. The bearing 43 is formed in a cylindrical shape and has an inner circumferential surface 431. In this exemplary embodiment, the rotation shaft 41 is inserted through the bearing 43. More specifically, the bearing 43 has a through-hole 432 extending in the axial direction of the bearing 43, and the rotation shaft 41 is inserted through the through-hole 432. The bearing 43 according to this exemplary embodiment includes a resin layer 434 containing a solid lubricant 433 and holding parts 45 that hold powder produced by the resin layer 434 being abraded.

The resin layer 434 is formed on the inner circumferential surface 431 of the bearing 43, at a portion to be in contact with the rotation shaft 41. The holding parts 45 are also provided in the inner circumferential surface 431 of the bearing 43. The bearings 43 illustrated in FIG. 5 and beyond also have, at least on the inner circumferential surface 431 thereof, the resin layer 434 containing the solid lubricant 433.

The resin layer 434 is formed by allowing a paint obtained by mixing the solid lubricant 433 in a molten resin to be attached to the inner circumferential surface 431 of the bearing 43. In this exemplary embodiment, after this paint is attached to the inner circumferential surface 431 of the bearing 43, the paint is dried at room temperature or is dried by heating. As a result, a cured film-like resin layer 434 is formed on the inner circumferential surface 431 of the bearing 43. Alternatively, the resin layer 434 may be formed over the entire surface of the bearing 43 by immersing the bearing 43 in the paint.

Herein, the paint serving as the base of the resin layer 434 contains, for example, a resin serving as a binder, the solid lubricant 433, an additive, and a solvent. Examples of the resin serving as a binder include polyamide-imide resin, epoxy resin, and acrylic resin. Examples of the solid lubricant 433 include molybdenum disulfide, polytetrafluoroethylene (PTFE), graphite, silver, and lead. Either one or multiple types of the lubricant 433 may be used. An example of the additive is anticorrosive. Example of the solvent include ethyl acetate, xylene, and methyl ethyl ketone.

The resin layer 434 is an example of a lubricant layer and lubricates the bearing 43 and the rotation shaft 41. Although the case where the lubricant layer is formed of resin has been described above, the lubricant layer may be formed of oil. More specifically, an oil lubricant layer may be formed by attaching oil containing the solid lubricant 433 to the bearing 43. Although the resin layer 434 is formed over the entire surface of the inner circumferential surface 431 of the bearing 43 in this exemplary embodiment, the resin layer 434 does not need to be formed over the entire surface, but may be formed on a portion of the inner circumferential surface 431. In other words, the resin layer 434 does not need to be formed over the entire portion to be in contact with the rotation shaft 41 in the bearing 43, but may be formed on a portion to be in contact with the rotation shaft 41 in the bearing 43.

The holding parts 45 are recesses formed in the bearing 43. The holding parts 45 are provided at one end 451 and the other end 452 of the bearing 43 in the axial direction. The holding part 45 may be provided at only one of the one end 451 and the other end 452. The tubular inner circumferential surface 431 has one end 431A and the other end 431B, and the holding parts 45 are provided at the one end 431A and the other end 431B. The holding part 45 may be provided at only one of the one end 431A and the other end 431B.

The bearing 43 also includes one end face 461 and the other end face 462. The one end face 461 is located on the one end 451 side of the bearing 43, and the other end face 462 is located on the other end 452 side of the bearing 43.

In this exemplary embodiment, recesses 45A serving as the holding parts 45 are provided at connecting portions between the one end face 461 and the inner circumferential surface 431 and between the other end face 462 and the inner circumferential surface 431. The recesses 45A are formed in a ring-like shape along the circumferential direction of the bearing 43. Furthermore, the recesses 45A are formed over the entire circumference of the bearing 43 in the circumferential direction thereof. The holding parts 45 are formed over the entire circumference of the bearing 43 in the circumferential direction thereof.

In this configuration example shown in FIG. 4, projections 47 are provided on the one end face 461 and the other end face 462 of the bearings 43. The projections 47 are formed in a ring-like shape along the circumferential direction of the bearing 43. The projections 47 are formed over the entire circumference of the bearing 43 in the circumferential direction thereof. The projections 47 do not need to be formed on the one end face 461 and the other end face 462. The projection 47 may be provided only on one of the one end face 461 and the other end face 462.

In this exemplary embodiment, there are gaps between the projections 47 and the rotation shaft 41, and the gaps serve as the holding parts 45 that hold the powder. These gaps are the recesses 45A, and the recesses 45A serve as the holding parts 45. Instead of the ring-like projections 47, multiple projections 47 may be provided along the circumferential direction of the bearing 43.

In this exemplary embodiment, the resin layer 434 that comes into contact with the outer circumferential surface of the rotation shaft 41 is abraded, producing powder. This powder enters the inside of the holding parts 45, which are defined by the recesses 45A. Thus, the holding parts 45 hold the powder. This powder contains the solid lubricant 433, and the holding parts 45 hold the solid lubricant 433. Thus, compared with a case where no holding parts 45 are provided, lubrication between the bearings 43 and the rotation shaft 41 is maintained for a longer period. As a result, compared with a case where no holding parts 45 are provided, the bearings 43 and the rotation shaft 41 are less likely to wear out.

Figure 5:
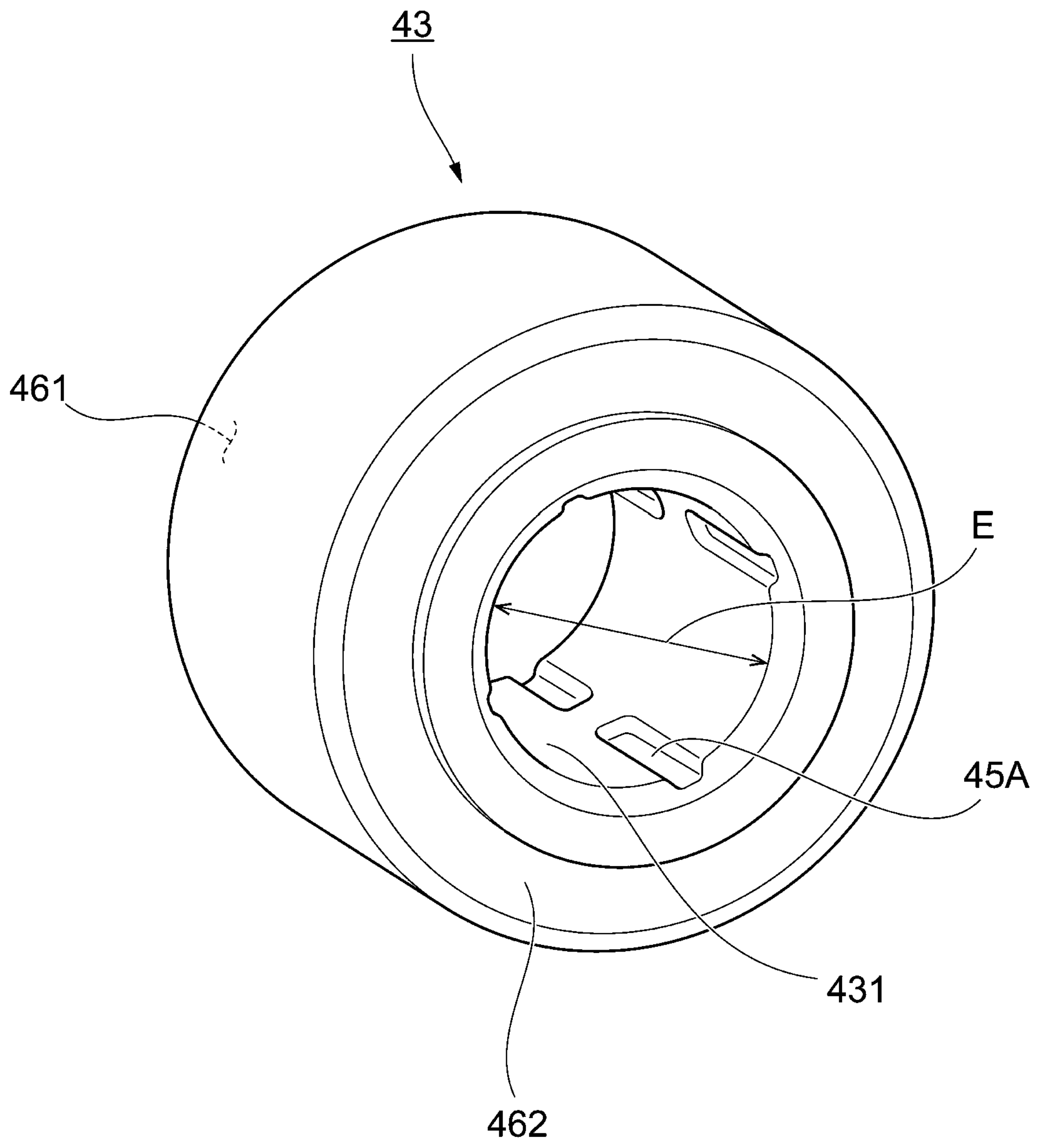
FIG. 5 is a perspective view showing another configuration example of the bearing.
Figure 6:
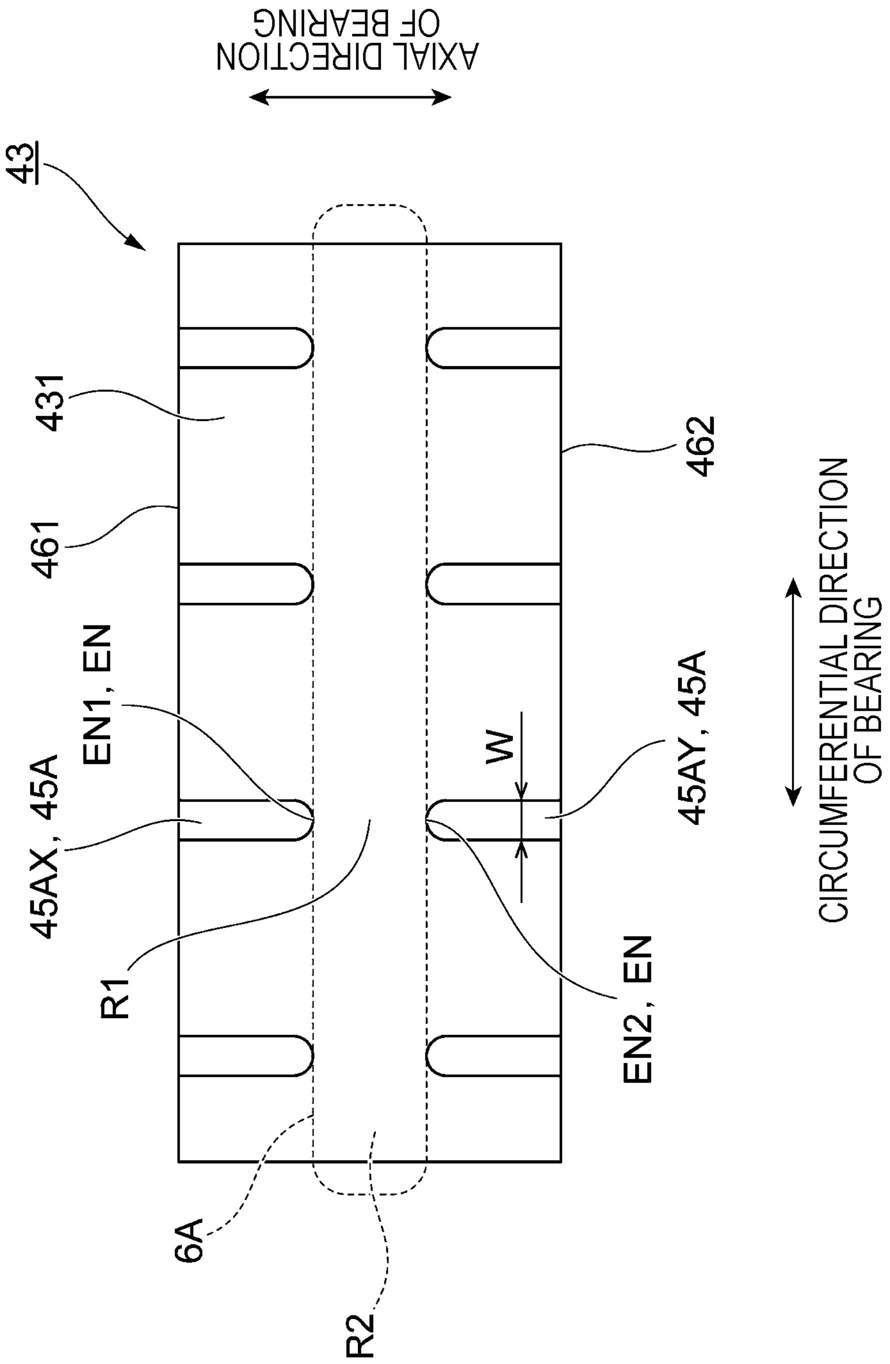
FIG. 6 is an unfolded view of an inner circumferential surface of the bearing.

FIG. 5 is a perspective view showing another configuration example of the bearing 43. FIG. 6 is an unfolded view of the inner circumferential surface 431 of the bearing 43 shown in FIG. 5. Also in this configuration example, as shown in FIG. 5, the bearing 43 is formed in a cylindrical shape. Similarly to the above, the bearing 43 has the one end face 461 and the other end face 462. Furthermore, the bearing 43 has the inner circumferential surface 431.

In this configuration example, groove-like recesses 45A extending in the axial direction of the bearing 43 are formed in the inner circumferential surface 431. The width W (see FIG. 6) of the recesses 45A may be 2-30% of the inside diameter E (see FIG. 5) of the bearing 43. As shown in FIG. 5, there are multiple recesses 45A. The recesses 45A are provided such that the positions thereof in the circumferential direction of the bearing 43 are different from one another. Furthermore, the recesses 45A are provided at predetermined intervals in the circumferential direction of the bearing 43.

In this exemplary embodiment, as shown in FIG. 6, one of the recesses 45A, namely, a recess 45AX, is formed so as to extend from a portion of the inner circumferential surface 431 meeting the one end face 461 (see also FIG. 5) toward the other end face 462. The recess 45AX does not reach the other end face 462. In this configuration example, a terminal end EN of the recess 45AX is located a certain distance away from the other end face 462.

Furthermore, in this configuration example, as shown in FIG. 6, a recess 45AY, which is different from the recess 45AX, is provided in the inner circumferential surface 431. The recess 45AY is located on an imaginary line extending from the recess 45AX. The recess 45AY is formed so as to extend from a portion of the inner circumferential surface 431 meeting the other end face 462 toward the one end face 461. The recess 45AY does not reach the one end face 461. A terminal end EN of the recess 45AY is located a certain distance away from the one end face 461.

In this configuration example, as shown in FIG. 6, a terminal end EN1, which is the terminal end EN of the recess 45AX extending toward the other end face 462, is located closer to the one end face 461 than another terminal end EN2, which is the terminal end EN of the recess 45AY extending toward the one end face 461, is. Furthermore, the terminal end EN2 of the recess 45AY extending toward the one end face 461 is located closer to the other end face 462 than the terminal end EN1 of the recess 45AX extending toward the other end face 462 is. Hence, there is a non-provision area R1, where no recesses 45A are formed, between the recess 45AX and the recess 45AY.

As shown in FIG. 6, there are multiple recesses 45AX provided at different positions in the circumferential direction of the bearing 43, and there are multiple recesses 45AY provided at different positions in the circumferential direction of the bearing 43. Furthermore, in this configuration example, each recess 45AX corresponds to one recess 45AY, and the recess 45AY is located on an imaginary line extending from the corresponding recess 45AX.

Furthermore, in this configuration example, the non-provision area R1 is provided so as to correspond to each pair of the recess 45AX and the recess 45AY. Thus, as shown in FIG. 6, a non-provision part R2, where no recesses 45A are formed, is provided inside dashed line 6A in the inner circumferential surface 431 of the bearing 43. The non-provision part R2 is provided in a ring-like shape along the circumferential direction of the bearing 43 and is formed over the entire circumference of the bearing 43 in the circumferential direction thereof.

Figure 7:
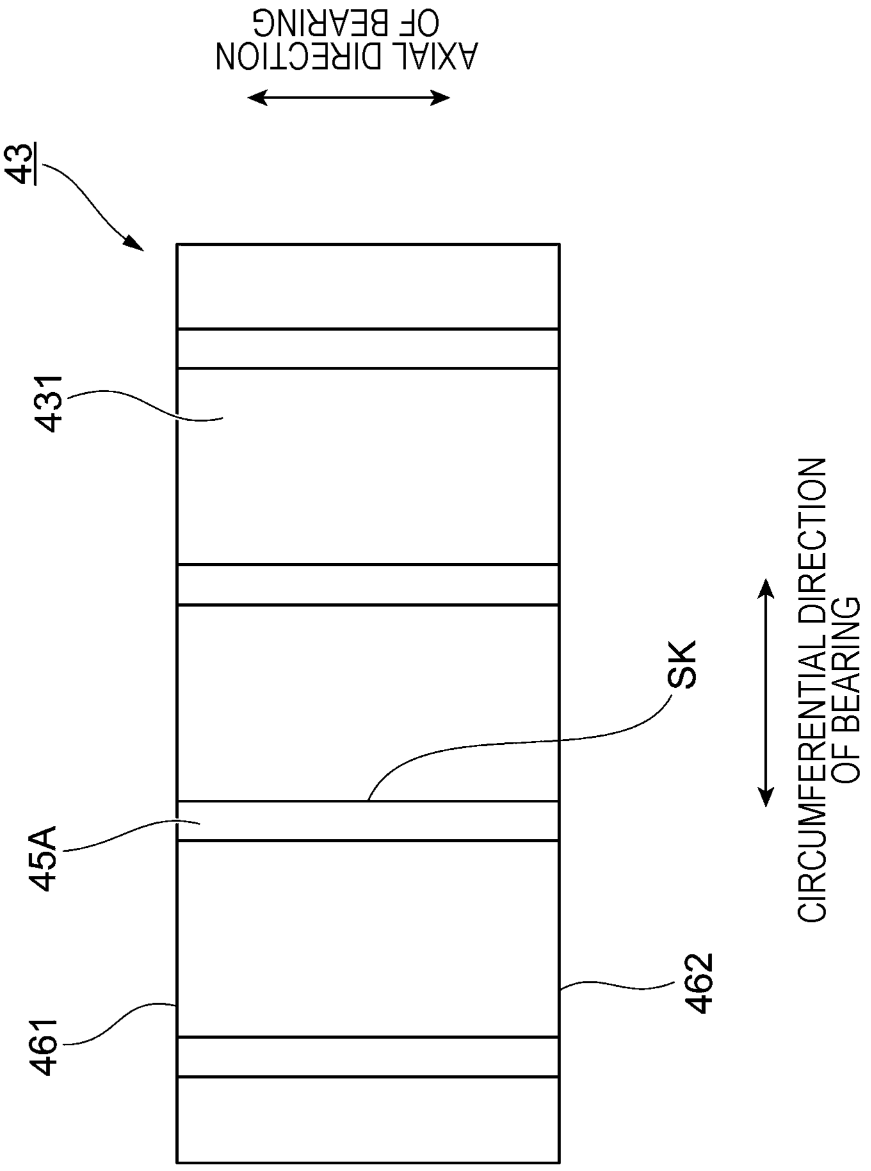
FIG. 7 shows an unfolded view of an inner circumferential surface of the bearing according to another configuration example.

As in this exemplary embodiment, when the non-provision part R2 is provided over the entire circumference of the bearing 43 in the circumferential direction thereof, the rotation shaft 41 rotates more smoothly. Here, an example configuration as shown in FIG. 7 (an unfolded view of the inner circumferential surface of the bearing 43 according to another configuration example) is assumed, in which the recesses 45A extending from one end face 461 to the other end face 462 are provided along the axial direction of the bearing 43, and no non-provision part R2 is provided.

In this case, the contact pressure between the bearing 43 and the rotation shaft 41 (not shown in FIG. 7) is increased at corners SK where the recesses 45A and the inner circumferential surface 431 meet, potentially making it difficult for the rotation shaft 41 to rotate. In contrast, as shown in FIG. 6, when the non-provision part R2 is formed over the entire circumference of the bearing 43 in the circumferential direction of the bearing 43, the rotation shaft 41 rotates easily.

Figure 8A:
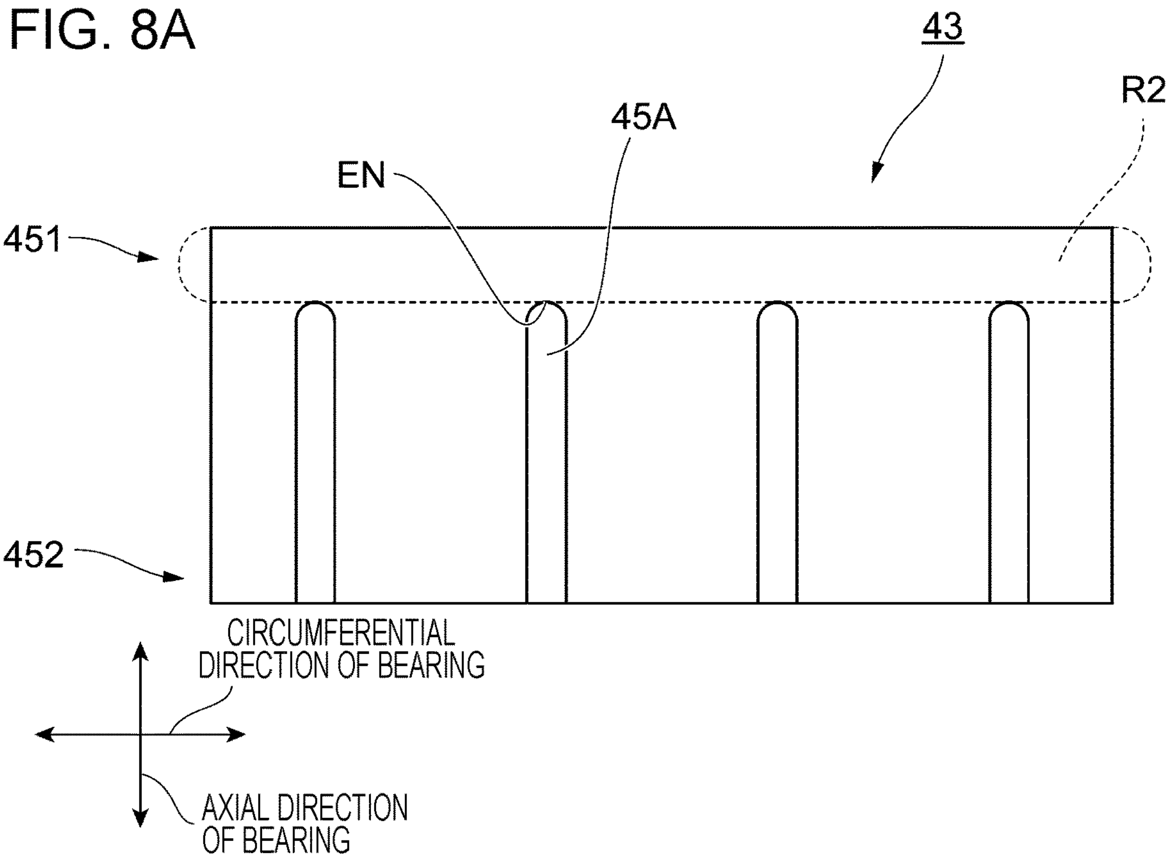
FIGS. 8A and 8B show another configuration example of the bearing.
Figure 8B:
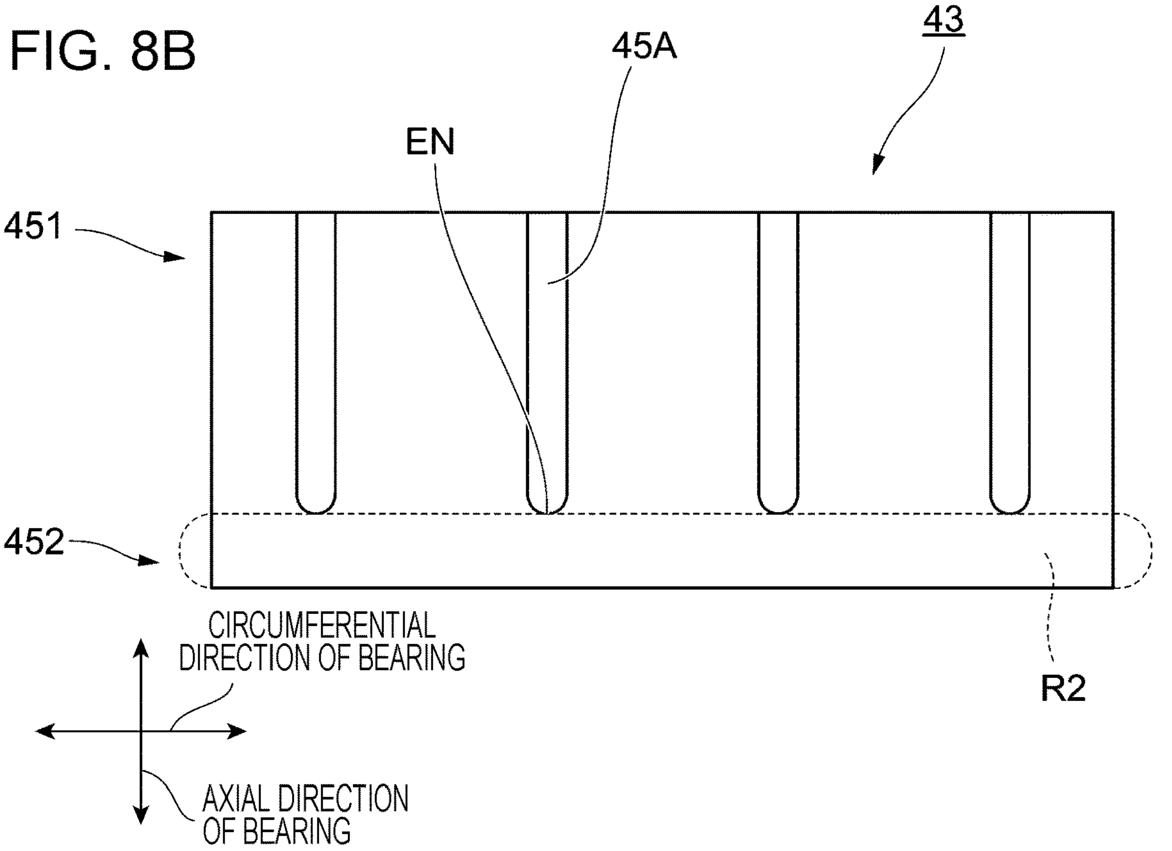

Although the non-provision part R2 is formed in the middle of the bearing 43 in the axial direction thereof in the configuration example shown in FIGS. 5 and 6, the configuration is not limited thereto, and, as shown in FIGS. 8A and 8B (showing another configuration example of the bearing 43), the non-provision part R2 may be provided at one end 451 or the other end 452 of the bearing 43 in the axial direction thereof. As shown in FIG. 8A, when the non-provision part R2 is provided at the one end 451 of the bearing 43 in the axial direction thereof, the ends EN of the recesses 45A extending from the other end 452 toward the one end 451 are positioned a certain distance away from the one end 451. As shown in FIG. 8B, when the non-provision part R2 is provided at the other end 452 of the bearing 43 in the axial direction thereof, the ends EN of the recesses 45A extending from the one end 451 toward the other end 452 are positioned a certain distance away from the other end 452.

Figure 9A:
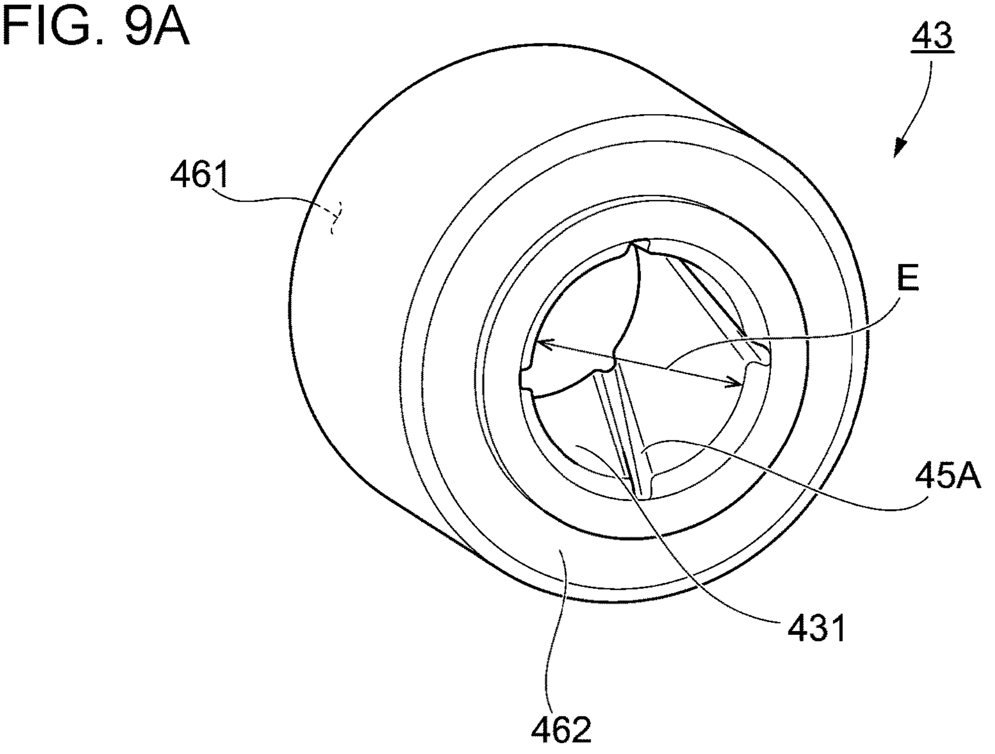
FIGS. 9A and 9B show another configuration example of the bearing.
Figure 9B:
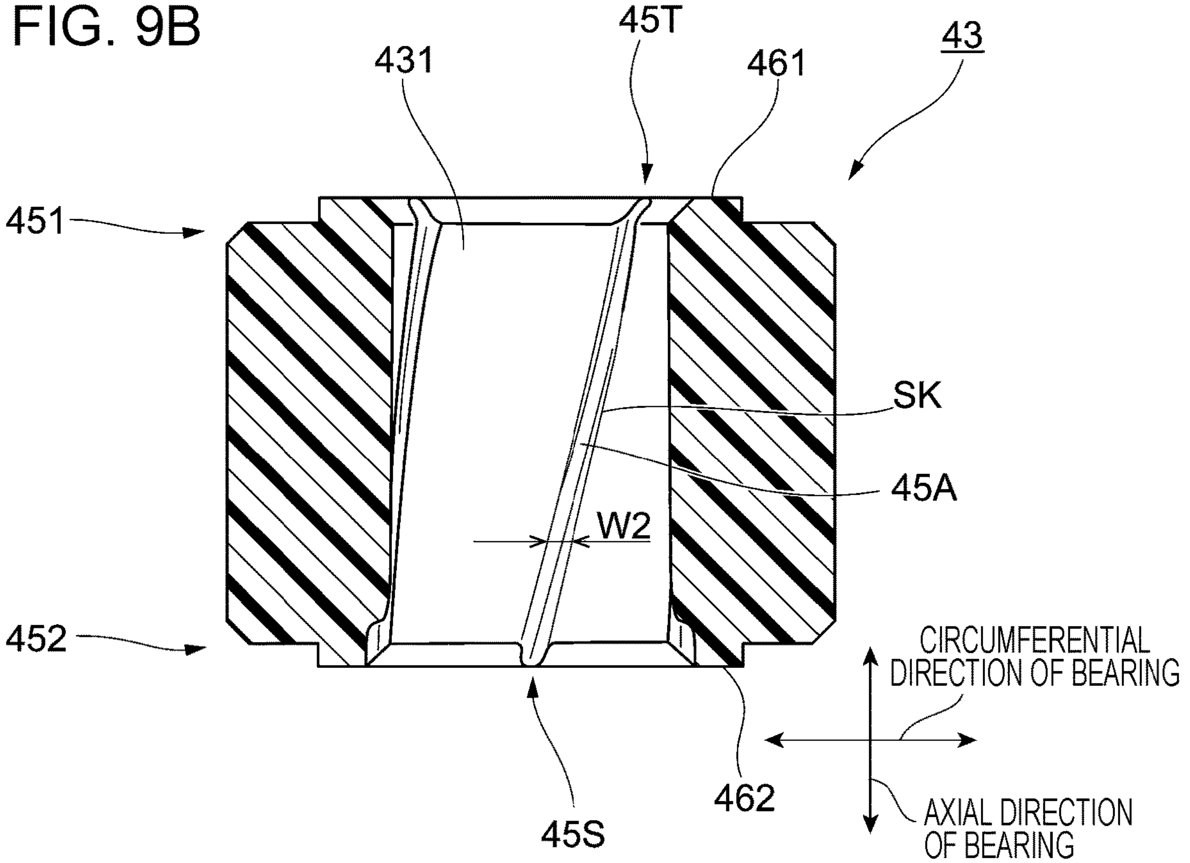

FIGS. 9A and 9B show another configuration example of the bearing 43. FIG. 9A is a perspective view of the bearing 43, and FIG. 9B is a sectional view of the bearing 43 taken along a plane parallel to the axial direction of the bearing 43. In this configuration example shown in FIGS. 9A and 9B, similarly to the above, as shown in FIG. 9A, the bearing 43 is formed in a cylindrical shape and has the one end face 461, the other end face 462, and the inner circumferential surface 431.

Also in this configuration example, as shown in FIG. 9A, the multiple groove-like recesses 45A are provided in the inner circumferential surface 431. Similarly to the above, the multiple recesses 45A are provided at different positions in the circumferential direction of the bearing 43. The recesses 45A are formed so as to extend from the one end face 461 toward the other end face 462 and have ends 45T (see FIG. 9B) located on the one end face 461 side and ends 45S located on the other end face 462 side.

The width W2 of the recesses 45A (see FIG. 9B) may be 2-30% of the inside diameter E (see FIG. 9A) of the bearing 43. In this configuration example, similarly to the above, the multiple recesses 45A are provided at predetermined intervals in the circumferential direction of the bearing 43.

Each recess 45A is formed in a spiral shape, and, in this configuration example, as shown in FIG. 9B, the position of the end 45T and the position of the end 45S of the recess 45A in the circumferential direction of the bearing 43 are different. In other words, as shown in FIG. 9B, each recess 45A is inclined with respect to both the axial direction and the circumferential direction of the bearing 43, and the position of the end 45T and the position of the end 45S of the recess 45A are different.

Although the non-provision part R2 shown in FIG. 6 is not provided in this configuration example, because the recesses 45A are formed in a spiral shape as described above, an increase in the contact pressure at the corners SK between the recesses 45A and the inner circumferential surface 431 is less likely to occur. Although the recesses 45A are formed from the one end face 461 to the other end face 462 in this configuration example shown in FIGS. 9A and 9B, the ends EN of the recesses 45A may be provided a certain distance away from the one end face 461 or the other end face 462, similarly to the configuration example shown in FIGS. 8A and 8B. In this case, the non-provision part R2 is provided. It is also possible to provide the recesses 45A in a spiral shape, as well as the non-provision part R2 in the middle of the bearing 43 in the axial direction thereof, as shown in FIG. 6.

Figure 10:
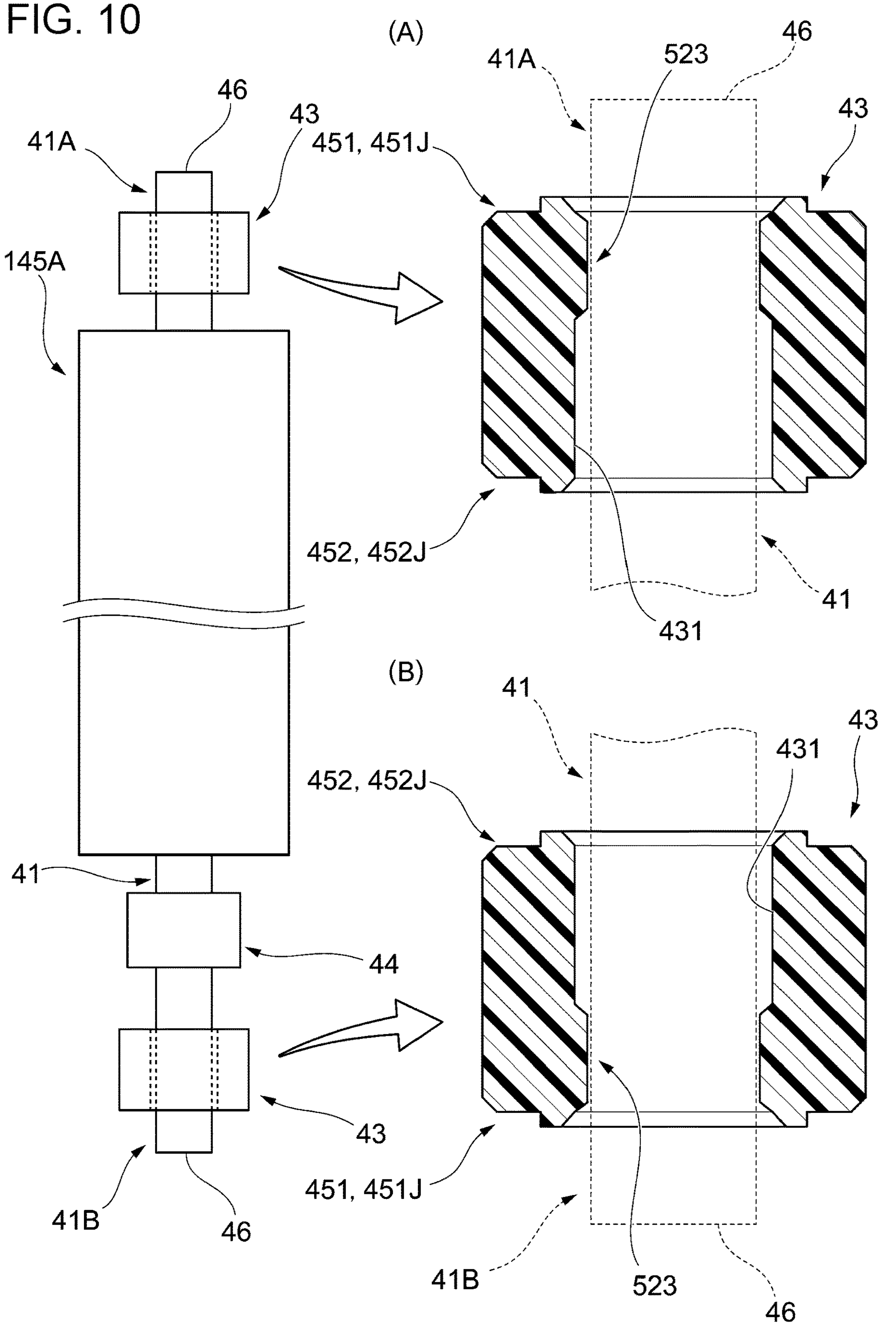
FIG. 10 consisting of (A) and (B) shows another configuration example of the bearing.

FIG. 10 consisting of (A) and (B) shows another configuration example of the bearing 43. FIG. 10 consisting of (A) and (B) shows the developing sleeve 145A. Also in this configuration example, as shown in FIG. 10 consisting of (A) and (B), the bearings 43 are formed in a cylindrical shape and have the inner circumferential surfaces 431. Furthermore, a projection 523 projecting from the inner circumferential surface 431 is provided on the inner circumferential surface 431 of the bearing 43. The projection 523 is provided in a ring-like shape along the circumferential direction of the bearing 43. Furthermore, the projection 523 is provided over the entire inner circumferential surface 431 of the bearing 43.

In this configuration example, as shown in FIG. 10 consisting of (A) and (B), the projection 523 is provided on the one end 451 side located closer to the free end 46 of the rotation shaft 41 (hereinbelow, a "free-end-side end 451J") in the two ends, i.e., the one end 451 and the other end 452, of the bearing 43.

In this exemplary embodiment, as described above, the portions, in the one end 41A and the other end 41B of the rotation shaft 41, located at the extreme ends serve as the free ends 46. Each bearing 43 has the free-end-side end 451J located closer to the free end 46, and the other end 452 (hereinbelow, an "opposite-side end 452J") located farther from the free end 46. In this configuration example shown in FIG. 10, the projection 523 is provided near the free-end-side end 451J of the bearing 43.

In this configuration example, the projection 523 restricts the movement of the powder located between the rotation shaft 41 and the inner circumferential surface 431 of the bearing 43, whereby the movement of the powder to the outside of the bearing 43 is less likely to occur. Thus, the bearing 43 holds the powder. Furthermore, because the gap between the portion near the free-end-side end 451J of the bearing 43 and the outer circumferential surface of the rotation shaft 41 is less likely to increase, the rotation shaft 41 stably rotates for a longer period, compared with a case where no projection 523 is provided.

In the rotation shaft 41, the side near the free end 46 is more likely to swing than the side near the driving-force receiving part 44, and consequently, in the bearing 43, the portion near the free-end-side end 451J is more likely to wear out. In this case, the gap between the portion near the free-end-side end 451J of the bearing 43 and the rotation shaft 41 is likely to increase. In contrast, in the configuration with the projection 523 as in this exemplary embodiment, even when the portion near the free-end-side end 451J of the bearing 43 is worn out, the gap is maintained to be small, and thus, the rotation shaft 41 rotates more stably.

From the standpoint of making the bearing 43 hold the powder, the projection 523 may be provided at a portion near the opposite-side end 452J, which is located opposite to the free-end-side end 451J. Also in this case, the projection 523 located closer to the opposite-side end 452J restricts the movement of the powder located between the inner circumferential surface 431 of the bearing 43 and the outer circumferential surface of the rotation shaft 41, and the movement of the powder to the outside of the bearing 43 is less likely to occur.

Furthermore, the projection 523 may be provided on both the portion near the free-end-side end 451J of the bearing 43 and the portion near the opposite-side end 452J of the bearing 43. Although it is difficult to form the projection 523 on both the portion near the free-end-side end 451J and the portion near the opposite-side end 452J when the bearing 43 is formed by injection molding, even when the bearing 43 is formed by injection molding, for example, by attaching a separate component serving as the projection 523 to the bearing 43, it is possible to form the projection 523 on both the portion near the free-end-side end 451J and the portion near the opposite-side end 452J.

Figure 11:
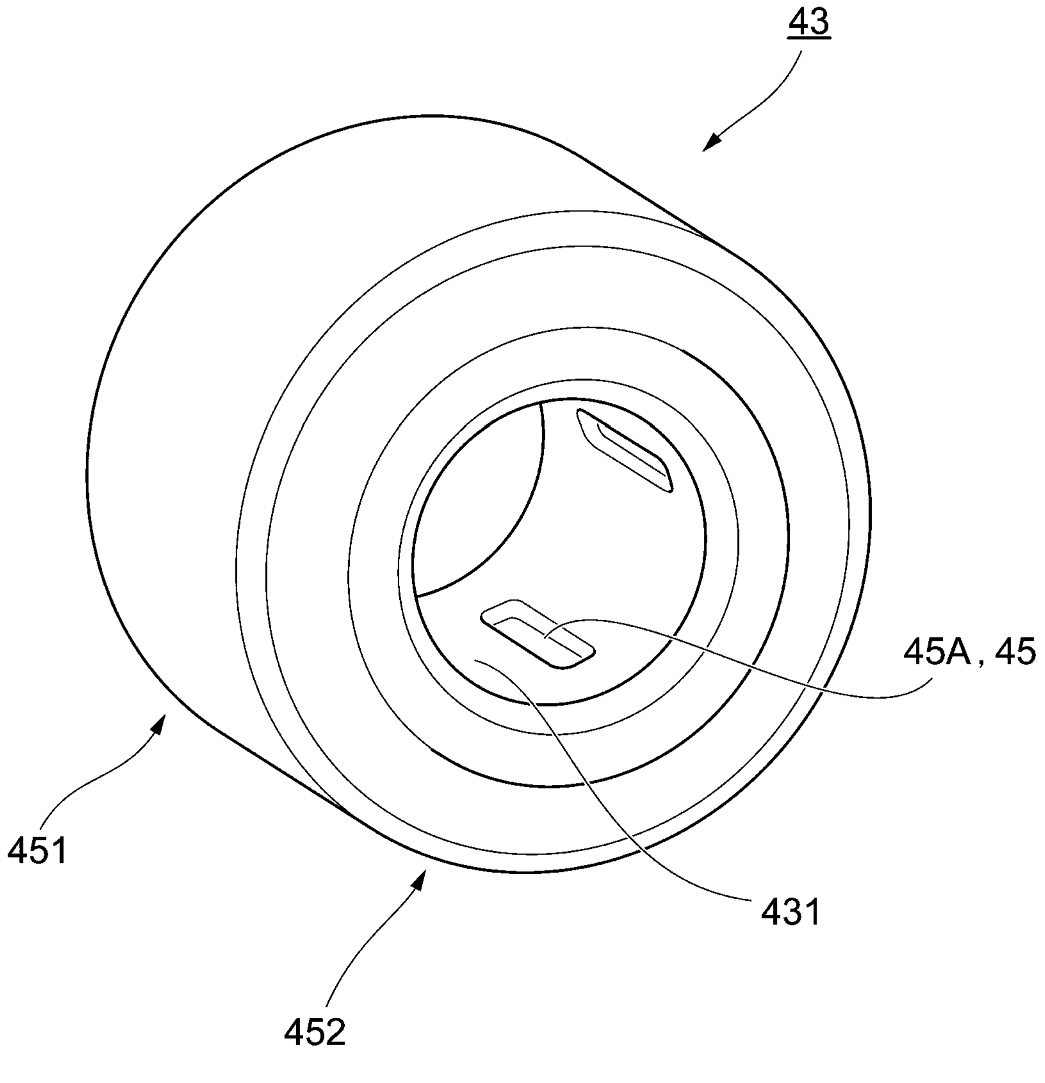
FIG. 11 shows another configuration example of the bearing.

Alternatively, as shown in FIG. 11, which shows another configuration example of the bearing 43, the recesses 45A serving as the holding parts 45 may be provided at positions closer to the other end 452 than the one end 451 of the bearing 43 is and closer to the one end 451 than the other end 452 of the bearing 43 is. In other words, the recesses 45A serving as the holding parts 45 may be provided between the one end 451 and the other end 452 of the bearing 43.

In the configuration examples shown in FIGS. 4 to 9, the recesses 45A communicate with the outside of the bearing 43 at at least one of the one end 451 and the other end 452 of the bearing 43, so that the recesses 45A are partially open. The configuration is not limited thereto, and, as shown in FIG. 11, the recesses 45A may not be open. In this case, the powder held by the holding parts 45 is less likely to move to the outside of the holding parts 45.

The bearing 43 according to this exemplary embodiment is formed of a resin material, and, when the bearing 43 is formed by injection molding, typically, the recesses 45A serving as the holding parts 45 are partially open. The configuration is not limited thereto, and the recesses 45A may not be partially open. When the recesses 45A that are not partially open are to be formed, for example, after the cylindrical bearing 43 is formed, the inner circumferential surface 431 is partially cut away so that the recesses 45A are formed.

Figure 12:
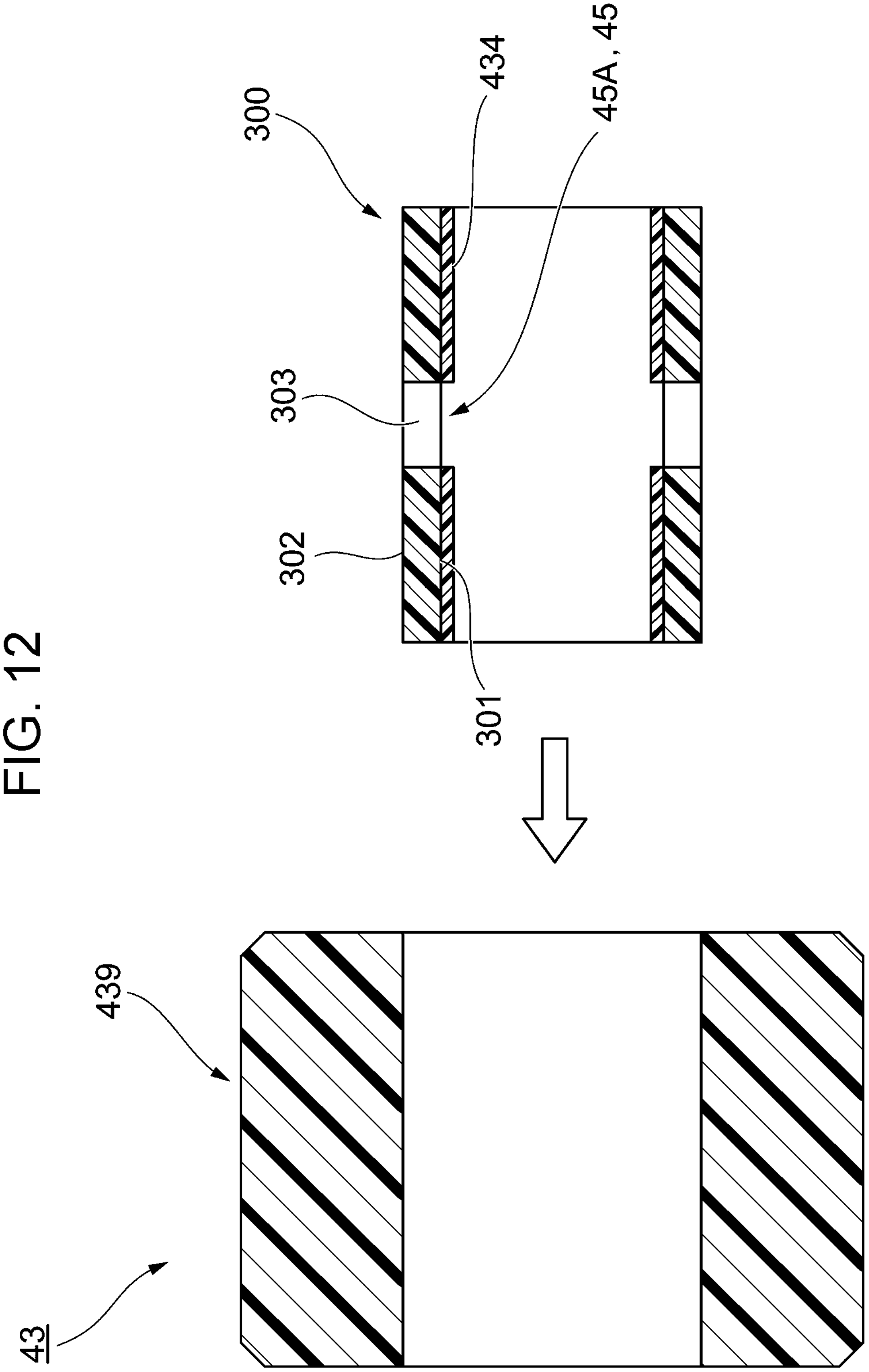
FIG. 12 shows another configuration example of the bearing.

Alternatively, for example, as shown in FIG. 12, which shows another configuration example of the bearing 43, it is possible to configure the bearing 43 such that a cylindrical member 300 having through-holes 303 connecting the inner circumferential surface 301 and the outer circumferential surface 302 and having a resin layer 434 on the inner circumferential surface 301 thereof is inserted into a body 439 of the bearing 43. In this case, when the cylindrical member 300 is inserted into the body 439 of the bearing 43, the through-holes 303 serve as the recesses 45A and function as the holding parts 45.

Figure 13:
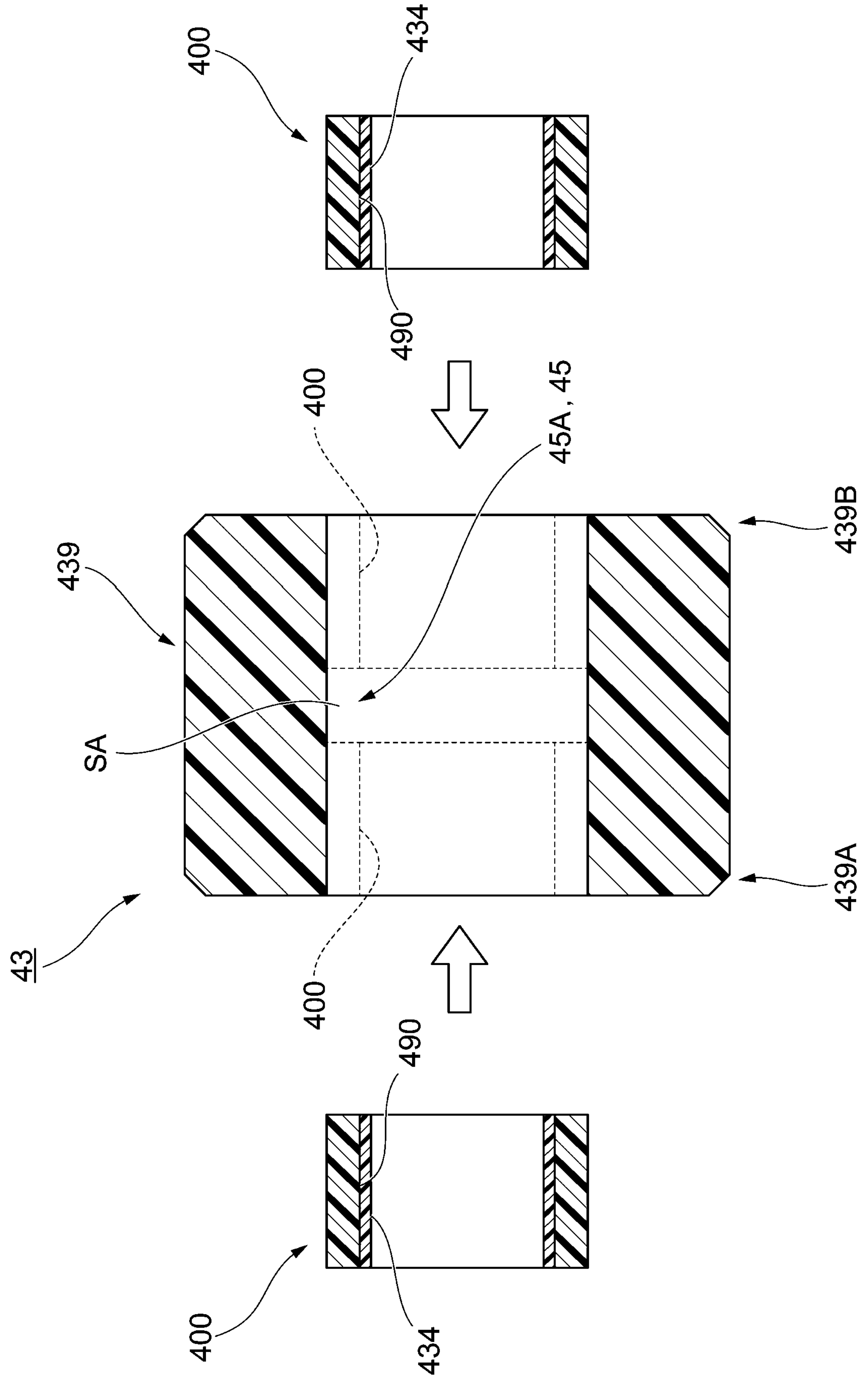
FIG. 13 shows another configuration example of the bearing.

Alternatively, for example, as shown in FIG. 13, which shows another configuration example of the bearing 43, cylindrical members 400 having resin layers 434 on inner circumferential surfaces 490 thereof may be inserted into the body 439 of the bearing 43 from both one end 439A and the other end 439B of the body 439 in the axial direction. In this case, a gap SA between the two cylindrical members 400 serves as the recess 45A and functions as the holding part 45.

Although an example case where the developing device 14 is an example of a device having the rotary body and the bearing 43 has been described above, the above-described rotary body and the bearing 43 may be provided in another device in the image forming apparatus 1. Furthermore, although an example case where the rotary body and the bearing 43 are provided in the image forming apparatus 1 has been described above, the rotary body and the bearing 43 may be provided in an apparatus other than the image forming apparatus 1. This apparatus is not specifically limited, as long as the apparatus has a rotary body. Examples of the apparatus include medical apparatuses, transport apparatuses, such as vehicles, air-conditioning apparatuses, such as air-conditioners, information processing apparatuses, such as computers, and apparatuses used in daily life, such as home appliances.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image forming apparatus including: a rotary body including a rotation shaft; and a bearing that supports the rotation shaft and that includes a lubricant layer formed of oil, resin, or the like and provided at a portion to be in contact with the rotation shaft, and a holding part that holds powder produced as a result of the lubricant layer being abraded.

(((2)))

The image forming apparatus according to (((1))), wherein the bearing is cylindrical, the rotation shaft is inserted through the bearing, the lubricant layer is formed on an inner circumferential surface of the bearing, and the holding part is provided in the inner circumferential surface of the bearing.

(((3)))

The image forming apparatus according to (((2))), wherein the inner circumferential surface is tubular, and the holding part is provided at at least one of one end and the other end of the inner circumferential surface in an axial direction.

(((4)))

The image forming apparatus according to any one of (((1))) to (((3))), wherein the holding part is a recess provided in the bearing.

(((5)))

The image forming apparatus according to (((4))), wherein the bearing is cylindrical, the rotation shaft is inserted through the bearing, the bearing has one end face, the other end face, and an inner circumferential surface, and the recess is provided at a portion where the one end face and the inner circumferential surface meet and/or a portion where the other end face and the inner circumferential surface meet.

(((6)))

The image forming apparatus according to (((5))), wherein the recess is formed in a ring-like shape along the circumferential direction of the bearing.

(((7)))

The image forming apparatus according to (((4))), wherein the recess is provided so as to extend in the axial direction of the bearing.

(((8)))

The image forming apparatus according to (((7))), wherein the bearing is cylindrical, the bearing has one end face, the other end face, and an inner circumferential surface, the recess is provided in the inner circumferential surface so as to extend from a portion where the inner circumferential surface meets the one end face toward the other end face and so as not to reach the other end face, and a terminal end of the recess is located a certain distance away from the other end face.

(((9)))

The image forming apparatus according to (((8))), wherein another recess that is different from one recess, which is equal to the recess, is provided in the inner circumferential surface, the other recess is provided so as to extend from a portion where the inner circumferential surface meets the other end face toward the one end face and so as not to reach the one end face, and a terminal end of the other recess is located a certain distance away from the one end face.

(((10)))

The image forming apparatus according to (((9))), wherein the terminal end of the one recess extending toward the other end face is located closer to the one end face than the terminal end of the other recess extending toward the one end face is.

(((11)))

The image forming apparatus according to (((10))), wherein the other recess is located on an imaginary line extending from the one recess, and an area where no recess is provided is present between the one recess and the other recess.

(((12)))

The image forming apparatus according to (((9))), wherein the one recess includes a plurality of recesses that are arranged at positions different from one another in the circumferential direction of the bearing, and the other recess includes a plurality of recesses that are arranged at positions different from one another in the circumferential direction of the bearing.

(((13)))

The image forming apparatus according to (((4))), wherein the bearing is cylindrical, the bearing has one end face, the other end face, and an inner circumferential surface, the recess is provided in the inner circumferential surface, extends from the one end face side toward the other end face side, and includes one end located on the one end face side and the other end located on the other end face side, and the position of the one end of the recess and the position of the other end of the recess in the circumferential direction of the bearing are different.

(((14)))

The image forming apparatus according to (((13))), wherein the recess is formed in a spiral shape.

(((15)))

The image forming apparatus according to (((4))), wherein the bearing is cylindrical, the recess is formed in an inner circumferential surface of the bearing, and a non-provision part in which no recess is formed is provided in a ring-like shape along the circumferential direction of the bearing, in the inner circumferential surface of the bearing.

(((16)))

The image forming apparatus according to (((1))), wherein the bearing is cylindrical, the bearing has one end face located at one end in the axial direction and the other end face located at the other end in the axial direction, a projection is provided on at least one of the one end face and the other end face, and the powder is held in a gap between the projection and the rotation shaft.

(((17)))

The image forming apparatus according to (((16))), wherein the projection is formed in a ring-like shape along the circumferential direction of the bearing.

(((18)))

The image forming apparatus according to (((1))), wherein the bearing is cylindrical, a projection is provided on an inner circumferential surface of the bearing, and the projection restricts movement of the powder located between the rotation shaft and the inner circumferential surface of the bearing, so that the powder is held by the bearing.

(((19)))

The image forming apparatus according to (((18))), wherein the projection is provided in a ring-like shape along the circumferential direction of the bearing.

(((20)))

The image forming apparatus according to (((18))) or (((19))), wherein the projection is provided at an end located closer to the free end of the rotation shaft in two ends of the cylindrical bearing.

(((21)))

A device including: a rotary body including a rotation shaft; and a bearing that supports the rotation shaft and that includes a lubricant layer formed of oil, resin, or the like and provided at a portion to be in contact with the rotation shaft, and a holding part that holds powder produced as a result of the lubricant layer being abraded.

(((22)))

A bearing that supports a rotation shaft, the bearing including: a lubricant layer formed of oil, resin, or the like and provided at a portion to be in contact with the rotation shaft; and a holding part that holds powder produced as a result of the lubricant layer being abraded.

What is claimed is:

1. An image forming apparatus comprising:

a rotary body including a rotation shaft; and a bearing that supports the rotation shaft and that includes a lubricant layer formed of oil, resin, or lubricant and provided at a portion to be in contact with the rotation shaft, and a holding part that holds powder produced as a result of the lubricant layer being abraded, wherein the bearing is cylindrical, the bearing has one end face located at one end in the axial direction and the other end face located at the other end in the axial direction, a projection is provided on at least one of the one end face and the other end face, the powder is held in a gap between the projection and the rotation shaft, an inner circumferential surface of the bearing is tubular, and the holding part is provided at, at least one of one end and the other end of the inner circumferential surface in an axial direction.

2. The image forming apparatus according to claim 1, wherein:

the bearing is cylindrical;

the rotation shaft is inserted through the bearing;

the lubricant layer is formed on the inner circumferential surface of the bearing; and the holding part is provided in the inner circumferential surface of the bearing.

3. The image forming apparatus according to claim 1, wherein the holding part is a recess provided in the bearing.

4. The image forming apparatus according to claim 3, wherein:

the bearing is cylindrical;

the rotation shaft is inserted through the bearing;

the bearing has one end face; the other end face; and an inner circumferential surface; and the recess is provided at a portion where the one end face and the inner circumferential surface meet and/or a portion where the other end face and the inner circumferential surface meet.

5. The image forming apparatus according to claim 4, wherein the recess is formed in a ring-like shape along the circumferential direction of the bearing.

6. The image forming apparatus according to claim 3, wherein the recess is provided so as to extend in the axial direction of the bearing.

7. The image forming apparatus according to claim 6, wherein:

the bearing is cylindrical;

the bearing has one end face; the other end face; and an inner circumferential surface;

the recess is provided in the inner circumferential surface so as to extend from a portion where the inner circumferential surface meets the one end face toward the other end face and so as not to reach the other end face; and a terminal end of the recess is located a certain distance away from the other end face.

8. The image forming apparatus according to claim 7, wherein:

another recess that is different from one recess; which is equal to the recess; is provided in the inner circumferential surface;

the other recess is provided so as to extend from a portion where the inner circumferential surface meets the other end face toward the one end face and so as not to reach the one end face; and a terminal end of the other recess is located a certain distance away from the one end face.

9. The image forming apparatus according to claim 8, wherein the terminal end of the one recess extending toward the other end face is located closer to the one end face than the terminal end of the other recess extending toward the one end face is.

10. The image forming apparatus according to claim 9, wherein the other recess is located on an imaginary line extending from the one recess, and an area where no recess is provided is present between the one recess and the other recess.

11. The image forming apparatus according to claim 8, wherein:

the one recess includes a plurality of recesses that are arranged at positions different from one another in the circumferential direction of the bearing; and the other recess includes a plurality of recesses that are arranged at positions different from one another in the circumferential direction of the bearing.

12. The image forming apparatus according to claim 3, wherein:

the bearing is cylindrical;

the bearing has one end face; the other end face; and an inner circumferential surface;

the recess is provided in the inner circumferential surface; extends from the one end face side toward the other end face side; and includes one end located on the one end face side and the other end located on the other end face side; and the position of the one end of the recess and the position of the other end of the recess in the circumferential direction of the bearing are different.

13. The image forming apparatus according to claim 12, wherein the recess is formed in a spiral shape.

14. The image forming apparatus according to claim 3, wherein:

the bearing is cylindrical;

the recess is formed in an inner circumferential surface of the bearing; and a non-provision part in which no recess is formed is provided in a ring-like shape along the circumferential direction of the bearing; in the inner circumferential surface of the bearing.

15. The image forming apparatus according to claim 1, wherein the projection is formed in a ring-like shape along the circumferential direction of the bearing.

16. The image forming apparatus according to claim 1, wherein:

the bearing is cylindrical;

a projection is provided on an inner circumferential surface of the bearing; and the projection restricts movement of the powder located between the rotation shaft and the inner circumferential surface of the bearing; so that the powder is held by the bearing.

17. A device comprising:

a rotary body including a rotation shaft; and a bearing that supports the rotation shaft and that includes a lubricant layer formed of oil, resin, or lubricant and provided at a portion to be in contact with the rotation shaft, and a holding part that holds powder produced as a result of the lubricant layer being abraded, wherein the bearing is cylindrical, the bearing has one end face located at one end in the axial direction and the other end face located at the other end in the axial direction, a projection is provided on at least one of the one end face and the other end face, the powder is held in a gap between the projection and the rotation shaft, an inner circumferential surface of the bearing is tubular, and the holding part is provided at, at least one of one end and the other end of the inner circumferential surface in an axial direction.

18. A bearing that supports a rotation shaft, the bearing comprising:

a lubricant layer formed of oil, resin, or lubricant and provided at a portion to be in contact with the rotation shaft; and a holding part that holds powder produced as a result of the lubricant layer being abraded, wherein the bearing is cylindrical, the bearing has one end face located at one end in the axial direction and the other end face located at the other end in the axial direction, a projection is provided on at least one of the one end face and the other end face, the powder is held in a gap between the projection and the rotation shaft, an inner circumferential surface of the bearing is tubular, and the holding part is provided at, at least one of one end and the other end of the inner circumferential surface in an axial direction.

* * * * *